United States Patent [19]

Katayama

[11] Patent Number: 4,922,102

[45] Date of Patent: May 1, 1990

[54] RADIATION-IMAGE READING APPARATUS

[75] Inventor: Chuji Katayama, Hachioji, Japan

[73] Assignee: Mac Science Co., Ltd., Tokyo, Japan

[21] Appl. No.: 196,624

[22] Filed: May 19, 1988

[30] Foreign Application Priority Data

May 25, 1987 [JP] Japan .............................. 62-127856
May 25, 1987 [JP] Japan .............................. 62-127857

[51] Int. Cl.$^5$ .......................... G03B 41/16; G03C 5/16
[52] U.S. Cl. .............................. 250/327.2; 250/484.1
[58] Field of Search ............... 250/327.2 D, 327.2 E, 250/327.2 F, 327.2 L, 484.1

[56] References Cited

U.S. PATENT DOCUMENTS

| | | | |
|---|---|---|---|
| 4,302,671 | 11/1981 | Kato et al. | 250/337 |
| 4,426,694 | 1/1984 | Kimura | 250/202 |
| 4,564,760 | 1/1986 | Noguchi et al. | 250/327.2 E |
| 4,629,890 | 12/1986 | Goto et al. | 250/327.2 F |
| 4,742,225 | 5/1988 | Chan | 250/327.2 D |

FOREIGN PATENT DOCUMENTS

| | | |
|---|---|---|
| 0007105 | 1/1980 | European Pat. Off. |
| 3137099 | 4/1980 | Fed. Rep. of Germany |
| 2438300 | 10/1979 | France |

*Primary Examiner*—Janice A. Howell
*Assistant Examiner*—Richard Hanig
*Attorney, Agent, or Firm*—Oliff & Berridge

[57] ABSTRACT

A radiation-image reading apparatus especially suited for reading weak X-ray diffraction images, including a radiation-image recording member formed of a support plate in the form of a disk having a phosphor layer, a light source for generating excitation light with which the phosphor layer is irradiated, a light detecting device for detecting light emitted from the phosphor layer of the radiation-image recording member when the phosphor layer is irradiated with the excitation light, the detecting device performing the detection at a position deviated from the optical axis of the excitation light, a condenser device for condensing the excitation light emitted from the light source to a point on the phosphor layer of the radiation-image recording member while changing divergent rays of light coming from the point on the phosphor layer, to which the excitation light is condensed, into parallel rays, a driving device for moving the position of the point on the phosphor layer of condensation effected by the condenser device so that the point moves relative to the disk-like support body in the radial direction of the disk, and a light reflecting member. The light reflecting member allows excitation light emitted from the light source to pass, leads the excitation light to the optical axis of the condenser device, and reflects light emitted from the phosphor layer which is changed into parallel rays by the condenser device and leads the parallel rays to the light detecting device and which includes a member serving as a total reflection mirror. The reflecting member has a total reflection surface for reflecting light in a total reflection manner formed on a surface of the reflecting member facing the phosphor layer and further having an aperture, for transmitting the excitation light, formed at its center at which the reflecting member intersects the path of the excitation light.

6 Claims, 1 Drawing Sheet

RADIATION-IMAGE READING APPARATUS

BACKGROUND OF THE INVENTION

1. Field of the Invention

This invention relates to a radiation-image reading apparatus which reads a recorded radiation image from a radiation-image recording medium formed by using, as a means for recording radiation images, a phosphor layer which absorbs or accumulates radiation. More particularly, this invention relates to an improvement of a type of radiation-image reading apparatus which reads a recorded radiation image by scanning the phosphor layer of the radiation-image recording medium with excitation light and detecting emission from the phosphor layer on the basis of a method of utilizing a phenomenon in which, if a phosphor layer is irradiated with excitation light, accelerated phosphorescence emission takes place at the phosphor layer in accordance with the intensity of the accumulated radiation.

2. Description of the Related Art

This type of radiation-image reading apparatus has been developed in place of a method based on a radiograph using silver salt with a view to avoiding problems, e.g., exhaustion of silver resources. There are examples of this type of radiation-image recording apparatus, such as the ones disclosed in Japanese Patent Laid-Open Nos. 59-13235 and 59-13236.

The apparatus described in these publications is provided with: a radiation-image recording member which records a radiation image by using a phosphor layer which absorbs and accumulates radiation and which emits light in accordance with the intensity of the accumulated radiation after it is irradiated with excitation light; a light source which generates the excitation light; and an emission detecting device which detects the emission from the phosphor layer by using a light reflecting member disposed in the path of the excitation light and receiving light generated by the emission from the phosphor layer (hereinafter referred to as "emission light") at a position deviated from the path of the excitation light. The phosphor layer is scanned with the excitation light, and the states of emission at the time of scanning at respective points on the scanning line are successively detected by the emission detecting device, thereby reading the radiation image recorded on the radiation-image recording member.

To improve the efficiency of reading, it is desired, in the system of scanning using the excitation light, to suitably design the shape of the radiation recording member and the method of moving the irradiation spot of the excitation light.

The above-mentioned publications disclose a technique of using a cylindrical phosphor layer, making this layer rotate about the axis thereof, and relatively moving the phosphor layer and the source of excitation light in the direction of the axis of the phosphor layer, and another technique of using a flat-plane phosphor layer and moving the irradiation spot longitudinally and latitudinally along the plane.

With respect to the shape of the radiation recording member and the method of moving the irradiation spot of the excitation light, however, it is also necessary to consider the adaptability to the outline of the radiation image recorded on the radiation recording member. If the shape of the recording member and the moving method are not designed with consideration for the outline of the radiation image, a useless part of the scanning increases so that the time taken to detect the outline of the image read and recognized is lengthened, resulting in a reduction in the efficiency of the reading operation, or the extent of movement of a movable part for use in the scanning increases so that the space occupied by the space is increased.

In general, conventionally, a dichroic mirror is used as the light reflecting member.

The light emitted from the phosphor layer is very weak compared with the excitation light. Therefore, to make the detection of emission more accurate and positive and increase the accuracy in the reading of the image, it is essential to minimize the loss of emission light in the path to the emission detecting device and thereby increase the amount of emission light reaching the emission detecting device while preventing strong light such as refection light from entering the emission detecting device.

A dichroic mirror was selected as the light reflecting member in the above-mentioned examples and was used as a measure to satisfy this requirement.

A dichroic mirror can provide a wavelength selecting property of allowing transmission of excitation light while reflecting emission light different from the excitation light. Therefore, it can eliminate reflection light from the excitation light by simply allowing transmission of this reflection light while it reflects light emitted from the phosphor layer to the emission detecting device.

However, the dichroic mirror tends to cause scattering and absorption or refraction due to its specific structure. In an apparatus which makes use of the dichroic mirror, there is a possibility of the emission light being reduced by scattering and absorption at the time of reflection, resulting in difficulty in detection of very weak emission, or there is a possibility deviation of the focal point during spot irradiation of the excitation light due to refraction at the time of transmission through the dichroic mirror, resulting in difficulty in performing reading with desired degrees of accuracy and definition. In particular, it is difficult to use the dichroic mirror in a case where a diffraction image obtained as a radiation image is very weak and where determination of the crystal orientation becomes incorrect unless the position of a diffraction spot can be read with accuracy, such as a case in which a crystalline substance is irradiated with X rays and a diffraction image thereby obtained is observed to examine the crystalline structure of the substance.

SUMMARY OF THE INVENTION

It is a general aim of the present invention to solve these problems, and an object of the present invention is to provide a radiation-image reading apparatus capable of reading with improved efficiency an image recognized mainly as concentric circles or a similar type of figure, such as a diffraction image of a Laue spot or Debye ring observed when a substance of a crystal structure such as a monocrystalline or polycrystalline structure is irradiated with a specific type of X ray, capable of directly obtaining the orientation or the grain size of the crystal from information on the read image by performing comparatively simple calculations on this information without temporarily converting this information into a figure as in the case of a conventional photographic method, and capable of minimizing the extent of movement of the movable part during scanning so as to reduce the space occupied by the apparatus.

Another object of the present invention is to provide a radiation-image reading apparatus capable of preventing light that is emitted from a phosphor layer from being attenuated by scattering or absorption as the light travels via a light reflecting member while preventing deviation of the position of irradiation with excitation light (focal point deviation) due to diffraction or other causes, and therefore capable of positively receiving and detecting the emission light even if the emission itself is very weak, and reading, with desired degrees of accuracy and definition, a radiation image recorded on the phosphor layer, the apparatus being adequately applicable to reading of X ray diffraction images.

To these ends, the present invention provides a radiation-image reading apparatus which is designed to overcome the above-described problems by improving the structure and operation of the radiation-image recording member, the apparatus having: a radiation-image recording member capable of recording a radiation image by means of a phosphor layer which absorbs and accumulates radiation and which emits light if it is thereafter irradiated with excitation light, the intensity of this emission being determined in accordance with the intensity of the accumulated radiation; a light source for generating the excitation light; and an emission detecting device which detects emission on the phosphor layer by receiving the light emitted from the phosphor layer at a position deviated from the path of the excitation light; wherein the phosphor layer for recording the radiation image is provided in the form of a disk and is capable of rotating, and wherein the phosphor layer is scanned with the excitation light while it is rotated and, at the same time, the irradiation spot of the excitation light is moved in the radial direction of the phosphor layer, thereby reading an intensity I of the light emitted from the phosphor layer at each of different points thereon and the position of this emission represented by, for example, a radius R and an angle of rotation $\theta$ of the disk. That is, the scanning is effected along concentric circles on the phosphor layer so that items of information thereon are successively read. If a certain significant image has been recorded on a concentric circle, it is not always necessary to scan the entire area of the phosphor layer, and the image can be read by being circularly scanned only one or several times. For instance, in a case where the radiation image is an X ray diffraction image of a substance of a monocrystalline structure or a polycrystalline structure (Laue spot, Debye ring, or the like), the orientation or the grain size of the crystal can be generally determined if only the position of at least one of spots distributed on concentric circles or the distribution coefficient is found. It is therefore possible to obtain image information sufficient for obtaining information on the orientation or the grain size by circularly scanning only one to several times. At the same time, if the scanning is effected over the entire area, a multiplicity of items of information on the orientation and the grain size can be obtained. It is possible to use these items of information in order to make the determination of the orientation definite or obtain other kinds of information by processing them in an averaging manner or in other different manners.

If the disk-like phosphor layer is scanned in such a manner that the excitation light is moved relative to the phosphor layer in the radial direction thereof while the phosphor layer is rotated, the distance through which the excitation light is moved in the radial direction becomes equal to the radius of the phosphor layer, that is, it is at most a half of the range in which the image is recorded, so that the extent of movement of the movable part is reduced. This arrangement thus enables a reduction in the space occupied by the apparatus.

In addition, this radiation-image reading apparatus makes use of a light reflecting mean which is adapted to introduce the light emitted from the phosphor layer to the light detecting means and which is of a newly developed type, in order to overcome the above-described problems. That is, the light reflecting member is constituted by a total reflection mirror which has an aperture for transmitting the excitation light and formed at its center at which the mirror intersects the path of the excitation light, and which has a total reflection surface for reflecting light in a total reflection manner formed on its surface facing the phosphor layer. In the use of this total reflection mirror provided as the light reflecting member, the excitation light emitted from the light source can be freely transmitted through the hole formed at the center of the total reflection mirror without being refracted, thereby preventing deviation of the position of irradiation with the excitation light (focal point deviation) due to refraction or other causes and enabling elaborate scanning with accurate spot irradiation.

In general, the excitation light is led to the phosphor layer perpendicularly thereto. In that case, the reflection of the excitation light most intensely takes place in the direction opposite to the direction of the entrance path (optical axis) of the excitation light, and the reflection light traveling along this entrance path can be freely transmitted through the total reflection mirror by the hole as in the case of the entering excitation light so that it is expelled to the side of the light source.

On the other hand, part of the emission light which travels along the entrance path is expelled to the side of the light source by being transmitted through the hole while the other part passing though the remaining area can suitably be reflected to the emission detecting device without causing scattering or absorption.

Therefore, the emission light can be prevented from being attenuated by scattering and absorption occurring at the reflecting surface of the light reflecting member at which the emission light is reflected, while only the amount of the part thereof that passes through the hole remains as a factor of attenuation. However, it is possible to minimize, by making the excitation light very fine, the hole to a very small size which is negligible when compared with the comparatively wide reflection area. The degree of attenuation corresponding to the amount of light passing through the hole is therefore negligible when compared with an increase in the amount of received light realized by the suitable reflection on the reflecting surface whose area is much greater than that of the hole.

Thus, the radiation-image reading apparatus in accordance with the present invention is capable of preventing the emission light from being attenuated by scattering or absorption occurring as this light travels via the light reflecting member, while preventing the position of irradiation with the excitation light (focal point deviation) due to diffraction or other causes, and this apparatus can therefore positively receive and detect the emission light even if the emission itself is very weak and, at the same time, it can read the radiation image recorded on the phosphor layer with desired degrees of accuracy and definition. Therefore, the present invention is also suitable for the application to the process of accurately reading a very weak image such as an X ray diffraction image.

DESCRIPTION OF THE PREFERRED EMBODIMENT

Figure 1:
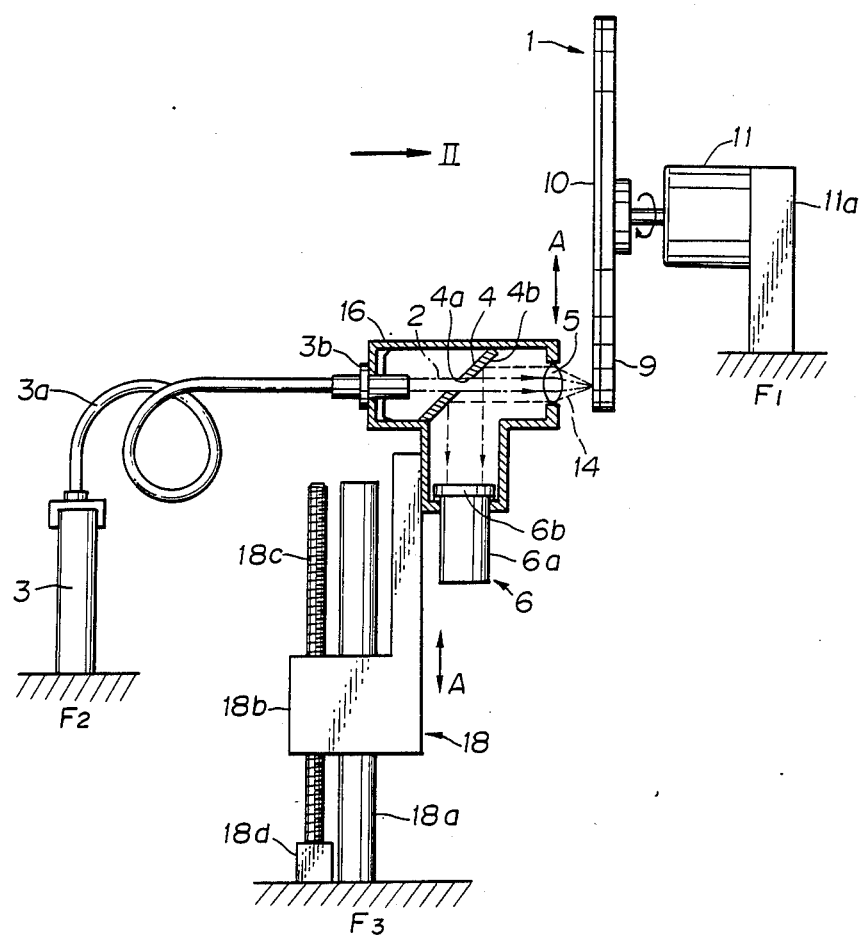
FIG. 1 is diagram of the whole of a radiation-image reading apparatus which represents an embodiment of the present invention.

Referring to FIG. 1, a radiation-image recording apparatus which represents an embodiment of the present invention is provided with a radiation-image recording member 1, a light source 3 for generating excitation light 2, a light reflecting member 4 disposed in the path of the excitation light 2, an aspherical lens 5 provided as a condenser means and positioned in the path of the excitation light 2 between the light reflecting means 4 and the radiation-image recording member 1, and an emission detecting device 6.

Figure 2:
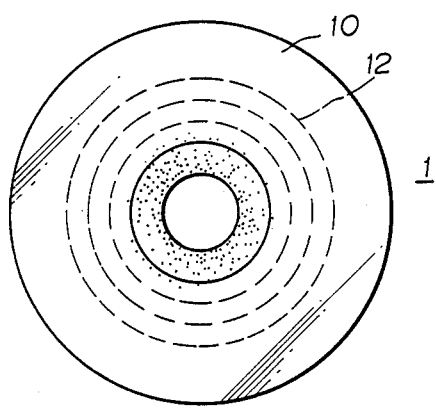
FIG. 2 is an illustration of a radiation image recording member as viewed in the direction of the arrow II in FIG. 1.

The radiation-image recording member 1 is composed of a support plate 9 in the form of a disk and a phosphor layer 10 in the form of a corresponding disk formed on a surface of the support plate 9, and is connected to a rotary drive means 11 such as a motor adapted to drive and rotate the support plate 9 about the center thereof. The motor 11 is secured by a fixing member 11a to a fixing portion $F_1$ (e.g., a frame of the apparatus). The phosphor layer 10 is formed in such a manner that a phosphor which has accumulation properties and which absorbs and accumulates radiation and, after being irradiated with the excitation light 2, emits light in the manner of accelerated phosphorescence emission in accordance with the intensity of the accumulated radiation is applied over the recording member 1 to a desired thickness. The recording member 1 records a radiation image 12 of a subject (see FIG. 2) when it is irradiated with radiation transmitted through the subject.

The phosphor layer 10 having the above properties may be a layer having a thickness of about 150 μm and formed from a material composed of BaFBr doped with $Er^{2+}$ (e.g., one marketed by Fuji Photo film Co., Ltd.).

The phosphor layer 10 functions such that, if it is irradiated with excitation light having a wavelength of 633 nm (oscillation wavelength of He-Ne laser) after being irradiated with radiation, it emits light having an intensity in accordance with the amount of this radiation (light having a wavelength of 400 nm). The support plate 9 is in the form of a disk having a radius of 200 mm and a thickness of 10 mm and made of aluminum (A2017P) and having a radius of 200 mm and a thickness of 10 mm. The motor 11 may be a well-known type of pulse motor. The rotational speed thereof can be controlled by electric pulses supplied from a well-known type of control circuit (not shown). At the same time, information on the angle of rotation of the motor can be obtained. It is assumed here that the excitation light 2 is electromagnetic radiation including visible light, ultraviolet light, infrared light while the radiation includes X rays, gamma rays, beta rays, alpha rays, and neutron rays.

The light source 3 is constituted by a He-Ne laser generating device (oscillation wavelength: 633 nm, oscillation output: 5 to 7 mW) and is fixed to a fixing portion $F_2$ (e.g., a portion of the frame of the apparatus). One end of a flexible optical fiber 3A is connected to the light source 3. A beam expander 3b is attached to the other end of the optical fiber 3a. The arrangement is such that excitation light having a beam diameter of 2 mm is issued from the light emitting end of the beam expander 3b.

The light reflecting member 4 is disposed in the path of the excitation light 2 and is adapted to separate light 14 emitted from the phosphor layer 10 from the reflection of the excitation light 2 and send the separated light to the emission detecting device 6. The light reflecting member 4 has at its center a hole 4a through which the excitation light 2 is introduced and at which it intersects the path of the excitation light 2. A mirror surface 4b for total reflection is formed on the surface of the light reflecting member 4 facing the phosphor layer 10 so that the light reflecting member 4 has a function of a total reflection mirror. In more detail, the light reflecting member is formed in such a manner that a major surface of a glass base (crown glass) in the form of a rectangular plate of 38×36 mm (thickness: 3 mm) is coated with aluminum, and a material such as $M_6F_2$ is evaporated over this aluminum coating to form an ultraviolet light transmission dielectric layer, thereby increasing the reflectivity to light having a wavelength of about 400 nm. A through hole having a diameter of 2 mm is formed at the center of the light reflecting member such that it extends along the path of the excitation light 2 (at an angle of approximately 45° from the major surface of the base).

The aspherical lens 5 is adopted as a novel feature in accordance with the present invention. A type of apparatus in which a spherical lens is used as a condenser lens for effecting spot irradiation on the phosphor layer 10 is known. However, the ratio of the aperture to the focal length of an aspherical lens can be higher than that of a spherical lens, and it is possible to greatly improve the condensation efficiency by using the such an aspherical lens.

The aspherical lens 5 has a focal length of 12 mm, a diameter of 18 mm, a thickness of 8.8 mm. The distance between the focal point and the surface of the lens 5 is 6.9 mm, and the reverse surface of the lens 5 is convex and spherical.

The emission detecting device 6 receives the emission light 14 reflected by the reflecting member 4 and thereby detects the emission. The emission detecting device 6 is provided with a photomultiplier 6a which receives light and outputs a predetermined signal in accordance with the intensity of the light, and a filter 6b which is disposed in front of the light receiving surface of the photomultiplier 6a and which functions to eliminate light other than the emission light 14. The emission detecting device is disposed in a position deviated from the path of the excitation light 2. An output signal supplied from the photomultiplier 6a is calculated or displayed by an image information processing device (constituted by, for example, a 16-bit microcomputer) or a display device (constituted by, for example, a CRT display having 600×600 dots).

The photomultiplier 6a may be a type of photomultiplier capable of detecting light having a wavelength ranging from 300 to 650 nm (extensively on the market).

The filter 6b may be a color glass filter which allows only light having a wavelength of 400 nm to pass, or a group of several glass filters of this type superposed on each other.

The support frame 16 integrally supports the beam expander 3b disposed at the light emitting end of the optical fiber 3a, the aspherical condenser lens 5, and the emission detecting device 6 while maintaining in a certain relationship therebetween. In the relationship maintained by the support frame 16, the light reflecting member 4 is inclined by an angle of 45° from the path of the excitation light 2; the excitation light 2 is led to the phosphor layer 10 perpendicularly thereto; and the emission light 14 is reflected in the direction perpendicular to the excitation light 2.

The support frame 16 can be moved by a driving means 18 in the direction along the surface of the phosphor layer 10 (direction indicated by arrow A in the figure) from the outer periphery of the phosphor layer 10 over a range generally corresponding to the radius of the phosphor layer 10. The speed at which the support frame 16 moves can be set in a linked relationship with the rotational speed of the rotary drive means 11.

The driving means 18 is constituted by a guide rod 18a standing on a fixing portion $F_3$ (e.g., a portion of the frame of the apparatus), a movable piece 18b slidably fitted around the guide rod 18a, a screw rod 18c screwed into the movable piece 18b, and a pulse motor 18d adapted to drive and rotate the screw rod 18c.

The support frame 16 is fixed to an upper portion of the movable piece 18b as viewed in FIG. 1 while the motor 18d is fixed to the fixing portion $F_3$. The movable piece 18b can be moved in the direction indicated by the arrow A in FIG. 1 by the control of the motor 18d using a well-known type of control circuit (not shown). In this case, it is possible to obtain the positional information relating to this movement by, for example, a well-known method of counting the number of pulses supplied to the pulse motor 18d.

In the described example of the arrangement in accordance with the present invention, the condenser means is moved while the phosphor layer is fixed, in order that the position of the condensing point of the condenser means on the phosphor layer is moved relative to this layer. Conversely, the arrangement may be such that the phosphor layer is moved while the condenser means is fixed. This type of arrangement, which will not be described in detail, can be realized in a comparatively simple manner. For example, it is constructed by securing the support frame 16 to the fixing portion $F_3$ while attaching the support plate 9 to the movable piece 18b of the driving means 18 (secured to the fixing portion $F_1$).

The image reading operation of this radiation-image reading apparatus is conducted in such a manner that the phosphor layer 10 is rotated by the rotary drive means 11 while the support frame 16 is moved at a certain speed each time the phosphor layer 10 makes one round so that the phosphor layer 10 is scanned with the excitation light 2.

That is, states of emission at respective points on the scanning line at the time of scanning are successively detected by the emission detecting device 6, thereby reading the radiation image recorded on the phosphor layer 10.

This process may be conducted by setting the rotational speed of the support plate 9 to about 400 rpm and intermittently moving the support frame 16 to a certain distance each time the support plate makes one round, or it is conducted by setting the rotational speed of the support plate 9 to 400 rpm and continuously moving the support frame 16 at a speed of about 50 mm/min in a linked relationship with the rotation of the support plate 9.

It is preferable to set the speeds of rotation and movement of these members within a range of 200 to 2000 rpm and a range of 25 to 500 mm/min, respectively. If the speeds are below these ranges, advantages of the use of this apparatus for reading are not conspicuous. If the speeds are above these ranges, it is difficult for existent data processing devices to perform desired calculations.

In the above-described arrangement, the phosphor layer 10 is provided in the form of a disk and is designed to rotate; the light emitting end of the light source 3, the light reflecting member 4, the aspherical lens 5 and the emission detecting device 6 are collectively retained by the support frame 16; and the support frame is made movable, thereby making it easy to control the movable part at the time of scanning and minimizing the extent of movement of the movable part such that the distance through which the support frame 16 moves becomes generally equal to the radius of the phosphor layer 10, that is, a half of the range in which the image is recorded. This arrangement thus enables a reduction in the space occupied by the apparatus.

Also, in a case where the radiation image is an X ray diffraction image of a substance of a monocrystalline structure or a polycrystalline structure, the orientation or the grain size of the crystal can be generally determined if only the position of at least one of spots distributed on concentric circles or the distribution coefficient is found. It is therefore possible to obtain image information sufficient for obtaining information on the orientation or the grain size by circularly scanning only one to several times. At the same time, if the scanning is effected over the entire area, a multiplicity of items of information on the orientation and the grain size can be obtained. It is possible to use these items of information in order to make the determination of the orientation definite or obtain other kinds of information by processing them in an averaging manner or in other different manners. The positional information for determination of the orientation is directly obtained as an angle of rotation $\theta$ and a radius R of the disk by calculating the image information read out in the above step, without temporarily making the diffraction image visible and thereafter reading R and $\theta$ from the visible image as in the case of the conventional photographic method. Moreover, these calculations are remarkably simpler than those in the case of other scanning methods of, e.g., scanning longitudinally and latitudinally, actually enabling a performance which could not be attained by the conventional photographic method, e.g., a performance of immediately calculating the orientation and grain size of the crystal by instantaneously reading the diffraction image of the crystal accumulated on the phosphor layer.

In addition, this radiation-image reading apparatus makes use of a total reflection mirror as the light reflecting member 4 so that the excitation light emitted from the light source 3 is freely transmitted through the hole 4a formed at the center of the total reflection mirror without being refracted, thereby preventing deviation of the position of irradiation with the excitation light 2 (focal point deviation) due to refraction or other causes and enabling elaborate scanning with accurate spot irradiation.

In general, the excitation light 2 is led to the phosphor layer 10 perpendicularly thereto. In that case, the reflection of the excitation light 2 most intensely takes place in the direction opposite to the direction of the entrance path (optical axis) of the excitation light 2, and the reflection light traveling along this entrance path can be freely transmitted through the total reflection mirror by the hole 4a as in the case of the entering excitation light 2·so that it is expelled to the side of the light source 3.

On the other hand, part of the emission light 14 which travels along the entrance path is expelled to the side of the light source 3 by being transmitted through the hole 4a while the other part passing though the remaining area can suitably be reflected to the emission detecting device 6 without causing scattering or absorption.

Therefore, the emission light 14 can be prevented from being attenuated by scattering and absorption occurring at the reflecting surface of the light reflecting member 4 at which the emission light 14 is reflected, while only the amount of the part thereof that passes through the hole 4a remains as a factor of attenuation. However, it is possible to minimize, by making the excitation light very fine, the hole 4a to a very small size which is negligible when compared with the comparatively wide reflection area. The degree of attenuation corresponding to the amount of light passing through the hole 4a is therefore negligible when compared with an increase in the amount of received light realized by the suitable reflection on the reflecting surface whose area is much greater than that of the hole 4a.

As described above, in the radiation-image reading apparatus in accordance with the present invention, the light 14 emitted from a phosphor layer is prevented from being attenuated by scattering or absorption occurring as it travels via the light reflecting member 14 while the position of irradiation with the excitation light (focal point deviation) due to diffraction or other causes is also prevented, so that the emission light can therefore be positively received and detected even if the emission itself is very weak, and that the radiation image recorded on the phosphor layer 10 can be read with desired degrees of accuracy and definition. Therefore, the present invention is also suitable for application to a case where a diffraction image obtained as the radiation image is very weak and where determination of the crystal orientation becomes incorrect unless the position of a diffraction spot can be read with accuracy, such as a case in which a crystalline substance is irradiated with X rays and a diffraction image thereby obtained is observed to examine the crystalline structure of the substance.

What is claimed is:

1. A radiation-image reading apparatus, comprising:
   a radiation-image recording member having a phosphor layer having a property of emitting light from a point previously irradiated with radiation when being irradiated at said point with excitation light, the intensity of light emitted from said phosphor layer being determined in accordance with the intensity of said radiation;
   a light source for generating excitation light with which said phosphor layer of said radiation-image recording member is irradiated; and
   light detecting means for detecting light emitted from said phosphor layer of said radiation-image recording member when said phosphor layer is irradiated with said excitation light, said detecting means performing said detecting at a position deviated from an optical axis of said excitation light, said radiation-image reading apparatus reading a radiation image recorded on said radiation-image recording member by scanning said phosphor layer with said excitation light along a scanning line and detecting, by means of said light detecting means, light emitted from respective points of said phosphor layer along the scanning line, said radiation-image recording member being formed of a support plate in the form of a disk capable of rotating about an axis passing said disk at the center thereof perpendicularly thereto, and a phosphor layer having said property and formed on said support plate, said radiation-image reading apparatus further comprising:
   condenser means for condensing said excitation light emitted from said light source to a point on said phosphor layer of said radiation-image recording member while changing divergent rays of light coming from said point on said phosphor layer, to which said excitation light is condensed, into parallel rays;
   driving means for moving said position of said point on said phosphor layer of condensation effected by said condenser means so that said point moves relative to said disk-like support body in the radial direction of said disk; and
   a light reflecting member for allowing excitation light emitted from said light source to pass, for leading said excitation light to the optical axis of said condenser means, for reflecting light emitted from said phosphor layer and changed into parallel rays by said condenser means, and for leading said parallel rays to said light detecting means, said light reflecting member including a member which serves as a total reflection mirror, having an aperture formed at a center of said light reflecting member, for transmitting said excitation light, at which said reflecting member intersects the path of said excitation light, a total reflection surface for reflecting light in a total reflection manner being formed on a surface of said reflecting member facing said phosphor layer.

2. A radiation-image reading apparatus according to claim 1, wherein said driving means includes means for intermittently moving in a linked relationship with the rotation of said disk-like support body.

3. A radiation-image reading apparatus according to claim 2, wherein said driving means includes means for moving one step each time said disk-like support body makes one rotation.

4. A radiation-image reading apparatus according to claim 1, wherein said driving means includes means for continuously moving in a linked relationship with the rotation of said disk-like support body.

5. A radiation-image reading apparatus according to claim 1, wherein said driving means includes means for moving at a speed ranging from 25 to 250 mm/min when said disk-like support body rotates at a speed ranging from 200 to 2000 rpm.

6. A radiation-image reading apparatus according to claim 1, wherein said condenser means includes an aspherical lens.

* * * * *